(12) United States Patent
Tysak

(10) Patent No.: US 8,999,451 B2
(45) Date of Patent: Apr. 7, 2015

(54) LOW GLOSS AQUEOUS COATING COMPOSITIONS CONTAINING POLY(ETHYLENE OXIDE)

(75) Inventor: Theodore Tysak, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 13/606,108

(22) Filed: Sep. 7, 2012

(65) Prior Publication Data

US 2013/0072620 A1 Mar. 21, 2013

Related U.S. Application Data

(60) Provisional application No. 61/535,082, filed on Sep. 15, 2011.

(51) Int. Cl.
| | | |
|---|---|---|
| *B05D 3/02* | (2006.01) |
| *C09D 171/02* | (2006.01) |
| *C09G 1/04* | (2006.01) |
| *C09D 5/02* | (2006.01) |
| *C09D 7/12* | (2006.01) |

(52) U.S. Cl.
CPC ............... *C09D 171/02* (2013.01); *C09G 1/04* (2013.01); *C09D 5/027* (2013.01); *C09D 7/125* (2013.01)

(58) Field of Classification Search
CPC ...... C09D 171/02; C09D 5/027; C09D 7/125; C09G 1/04
USPC ............. 427/389, 384, 385.5; 252/8.57
See application file for complete search history.

(56) References Cited

U.S. PATENT DOCUMENTS

| | | | |
|---|---|---|---|
| 2,795,564 A | 6/1957 | Conn et al. | |
| 3,328,325 A | 6/1967 | Zdanowski | |
| 3,467,610 A | 9/1969 | Fiarman | |
| 3,554,790 A | 1/1971 | Gehman et al. | |
| 3,573,329 A | 3/1971 | Lynn | |
| 3,711,436 A | 1/1973 | Oliver et al. | |
| 3,808,036 A | 4/1974 | Zdanowski | |
| 3,930,921 A | 1/1976 | Connett | |
| 4,150,005 A | 4/1979 | Gehman et al. | |
| 4,374,872 A | 2/1983 | Eckert et al. | |
| 4,517,330 A | 5/1985 | Zdanowski et al. | |
| 5,002,584 A | 3/1991 | Tork et al. | |
| 5,061,517 A | 10/1991 | Speer | |
| 5,149,745 A | 9/1992 | Owens et al. | |
| 5,319,018 A | 6/1994 | Owens et al. | |
| 5,439,970 A * | 8/1995 | Reeb .................. 524/558 |
| 5,574,090 A | 11/1996 | Gray et al. | |
| 5,676,741 A | 10/1997 | Gray et al. | |
| 5,872,182 A | 2/1999 | Duan et al. | |
| 6,548,596 B1 | 4/2003 | Kohr et al. | |
| 6,579,923 B2 * | 6/2003 | Yarmey et al. ............. 524/262 |
| 7,842,129 B2 | 11/2010 | Cheistian et al. | |
| 2001/0022964 A1 * | 9/2001 | Leung et al. ................ 424/49 |
| 2002/0086936 A1 * | 7/2002 | Eoga ........................ 524/612 |
| 2004/0062913 A1 | 4/2004 | Suto et al. | |

FOREIGN PATENT DOCUMENTS

| | | |
|---|---|---|
| EP | 0623653 A2 | 11/1994 |
| EP | 0761778 A1 | 3/1997 |
| JP | H07102189 A | 4/1995 |
| JP | 07331117 A | 12/1995 |
| JP | 09176519 A | 7/1997 |
| JP | 2001214120 A | 8/2001 |
| JP | 2005112968 A | 4/2005 |
| JP | 2010179516 A | 8/2010 |
| JP | 2011168770 A | 9/2011 |
| WO | 2011008631 A2 | 1/2011 |
| WO | WO 2011/073115 * | 6/2011 ............ A23B 7/16 |

* cited by examiner

*Primary Examiner* — Robert S Walters, Jr.
(74) *Attorney, Agent, or Firm* — Cantor Colburn LLP

(57) ABSTRACT

The present invention relates to aqueous coating compositions having low gloss for floor polishes, finishes and sealer, as well as wall and floor paints and sealers. These aqueous coating compositions contain one or more water soluble poly (ethylene oxide) resins having the general formula [—CH$_2$CH$_2$O—]$_n$ and one or more polymer binders.

14 Claims, No Drawings

LOW GLOSS AQUEOUS COATING COMPOSITIONS CONTAINING POLY(ETHYLENE OXIDE)

FIELD OF THE INVENTION

The present invention relates to aqueous coating compositions having low gloss for floor polishes, finishes and sealer, as well as wall and floor paints and sealers. These aqueous coating compositions contain one or more water soluble poly (ethylene oxide) resins and one or more polymer binders.

BACKGROUND OF THE INVENTION

Control of gloss may be critical in the design and application of protective and/or decorative coatings for many substrates such as, for example, leather, wood, glass, masonry, vinyl and vinyl composition flooring, linoleum flooring and walls.

In certain applications such as floor coatings, it is desirable to control gloss while maintaining a degree of protection for the substrate. In some instances, too much gloss is not a desired feature, such as in the case where senior managed care facilities are concerned. Glossy floors tend to be perceived as slippery (even though they are not) by elderly patients of the facility. Reducing the gloss of the coating without impacting slip resistance, while also maintaining a film for protection of the substrate, is desired.

One way to lower gloss has been to add matting agents, which are either inorganic particles, such as, for example, silica, or calcium carbonate particles, or organic particles, such as, for example, polyurethane dispersions, that function by roughening the surface of the film, or water dispersed acrylic acid dispersants which function to coagulate and disrupt film formation. While effective at reducing gloss, these matting particles often disrupt film integrity and can lead to loss of key film properties such as water and abrasion resistance, slip, etc. Still further, the matting particles tend to polish or burnish after rubbing, leading to an increase in the gloss over time. Inorganic matting particles also tend then to settle out of solution.

Others have unsuccessfully attempted to overcome the problems associated with the use of matting particles by controlling of particle size, minimizing random light scattering, careful selection of refractive index between particle and matrix, or modifying the matrix or film forming polymer. However, such approaches sacrifice clarity or film properties for matte effect and can greatly limit the scope of useful compositions.

For example, U.S. Patent Application Publication No. 2004/0062913 describes an aqueous- or solvent-based thermosetting resin composition comprising organic or inorganic porous fine particle matting particles which provides a jet black material forming synthetic leather articles which resist color fading. When used in coating or film compositions, such matting particles as described in U.S. 2004/0062913, have a propensity to produce films with impaired quality and flexibility, and even chalky or hazy appearance. Furthermore, where the system is solvent-based, unacceptable amounts of volatile organic compounds (VOC's) are present, which is undesirable from a health, environmental and safety standpoint.

International Patent Application Publication No. WO 2011/008631 describes polymer compositions that contain a gloss reducing agent and are useful in various finish compositions such as floor care compositions. The gloss reducing agent described in WO 2011/008631 includes polymer and a metal salt of a fatty acid, which are described as chemical compounds that include a hydrocarbon (i.e., monovalent hydrocarbyl) chain, a carboxylic acid, and an associated metal ion.

The present invention provides coating compositions having low gloss but without loss of other beneficial characteristics.

SUMMARY OF THE INVENTION

The present invention provides a coating composition for use on floors comprising a water soluble poly(ethylene oxide) resin having the general formula $[-CH_2CH_2O-]_n$, wherein n=1,000-200,000. More particularly, the coating composition comprises: A) 20 to 95% by weight of an aqueous solvent comprising water; B) 5 to 80% by weight of a polymer binder; and C) 0.05 to 10% by weight of the water soluble poly (ethylene oxide) resin.

The water soluble poly(ethylene oxide) resin comprises polymerized units derived from ethylene oxide. The water soluble poly(ethylene oxide) resin may comprise polymerized units derived from ethylene oxide and propylene oxide. The water soluble poly(ethylene oxide) resin has a weight average molecular weight of from 50,000 to 8,000,000.

The polymer binder is a polymer comprising polymerized units derived from one or more ethylenically unsaturated monomers.

DETAILED DESCRIPTION OF THE INVENTION

The present invention relates to aqueous coating compositions, comprising a water soluble poly(ethylene oxide) resin and a water insoluble polymer binder, that are useful as matte (low gloss) floor coatings having burnishing resistance, slip resistance (passing static coefficient of friction). The water soluble poly (ethylene oxide) resin component and the water insoluble polymer binder component are compatible with each other such that the compositions remain free of sediment and gel while in solution, but after application to a substrate and drying, the compositions have a matte or opaque appearance.

It is noted that in the following description, endpoints of ranges are considered to be definite and are recognized to incorporate within their tolerance other values within the knowledge of persons of ordinary skill in the art, including, but not limited to, those which are insignificantly different from the respective endpoint as related to this invention (in other words, endpoints are to be construed to incorporate values "about" or "close" or "near" to each respective endpoint). The range and ratio limits, recited herein, are combinable. For example, if ranges of 1-20 and 5-15 are recited for a particular parameter, it is understood that ranges of 1-5, 1-15, 5-20, or 15-20 are also contemplated and encompassed thereby.

All percentages stated herein are weight percentages, unless otherwise stated. "Polymer," as used herein, means a polymeric compound prepared by polymerizing monomers, whether of the same or a different type. The generic term "polymer" includes the terms "homopolymer," "copolymer," "terpolymer" as well as "interpolymer." Also, as used herein, the terms "resin" and "polymer" are synonymous.

The term "polymerized units derived from" as used herein refers to polymer molecules that are synthesized according to polymerization techniques wherein a product polymer contains "polymerized units derived from" the constituent monomers which are the starting materials for the polymerization reactions.

Typically, the poly(ethylene oxide) ("PEO") resins suitable for use in the present invention and described in further detail hereinafter, comprise polymerized units derived from ethylene oxide. They may also comprise units derived from other monomers such as propylene oxide, in addition to ethylene oxide. The poly(ethylene oxide) ("PEO") resins are soluble in water and provide essentially clear, homogeneous compositions when dispersed in water. Surprisingly, when coating compositions, such as film forming compositions, are formulated containing these resins applied to a substrate, the dried coatings appear matte or opaque.

More particularly, water soluble poly(ethylene oxide) resins suitable for use in the present invention have the general formula [—$CH_2CH_2O$—]$_n$, wherein n=1,000-200,000, for example, 1,000-100,000, or even 1,000 to 50,000. The poly(ethylene oxide) resins may have a solubility in water of from 0.1% to 100%, at 20° C. and atmospheric pressure. Furthermore, suitable water soluble poly(ethylene oxide) resin components have a weight average molecular weight, $MW_w$, of 50,000 to 8,000,0000 grams per mole (g/mol), such as 75,000 to 4,000,000 g/mol, or even 100,000 to 1,000,000 g/mol.

Methods for preparing water soluble poly(ethylene oxide) resins suitable for use in the aqueous coating compositions of the present invention are familiar to persons of ordinary skill in the relevant art and are not particularly limited. For example, heterogeneous coordination anionic polymerization of ethylene oxide in non-solvent diluents, in the presence of a catalyst, would be suitable for preparation of water soluble poly(ethylene oxide) resins. Catalysts known to facilitate such anionic polymerization including bases such as hydroxides, carbonates or other compounds of alkali or alkaline earth metals, or even those based on zinc. Additionally, cationic polymerization of ethylene oxide may be performed to obtain water soluble poly(ethylene oxide) resins, in the presence of catalysts including protonic acids ($HClO_4$, HCl), Lewis acids ($SnCl_4$, $BF_3$, etc.), organometallic compounds, or more complex reagents. It is also possible to prepare water soluble poly(ethylene oxide) resins from ethylene oxide by a ring-opening polymerization process using organo-metallic catalysts. Of course, where resins comprising polymerized units derived from ethylene oxide and another monomer, such as propylene oxide, is desired, both types of monomers should be present in the reactant mixture undergoing polymerization.

Poly(ethylene oxide) resins found to be successful for modifying the gloss/appearance of aqueous coating compositions include POLYOX™ water-soluble resins, which are nonionic, high molecular weight water-soluble poly(ethylene oxide) polymers, commercially available from The Dow Chemical Company of Midland, Mich., U.S.A. The different types and concentrations of suitable POLYOX compounds include, without limitation, POLYOX WSR N-10, POLYOX WSR N-80, POLYOX WSR N-750, POLYOX WSR N-3000, POLYOX WSR-205, POLYOX WSR-1105, POLYOX WSR N-12K, POLYOX WSR-301, POLYOX WSR Coagulant, POLYOX WSR-303, POLYOX WSR-308, UCARFLOC™ Polymer 300, UCARFLOC Polymer 302, UCARFLOC Polymer 304, UCARFLOC Polymer 309. For reference, representative POLYOX resins are listed in TABLE 1 below with their weight average molecular weights.

TABLE 1

| Type of POLYOX | Weight Average Molecular Weight* |
|---|---|
| Polyox WSR N-10 | 100,000 |
| Polyox WSR N-80 | 200,000 |
| Polyox WSR N-750 | 300,000 |
| Polyox WSR N-3000 | 400,000 |
| Polyox WSR N-12K | 1,000,000 |
| Polyox WSR N-60K | 2,000,000 |
| Polyox WSR-205 | 600,000 |
| Polyox WSR-301 | 4,000,000 |

*Based on rheological measurements.

Other commercially available poly(ethylene oxide) resin materials which may be suitable to enhance gloss control properties when formulated into coating compositions include, without limitation, ALKOX® resins from Meisei Chemical Works, LTD, of Kyoto, Japan. The ALKOX® resins have molecular weights ranging between 100,000 and 8,000,000. Particular examples of ALKOX® resins believed to be suitable are, for example, ALKOX R-150, ALKOX R-400, ALKOX R-1000, ALKOX E-30, ALKOX E-45, ALKOX E-60, ALKOX E-75, ALKOX E-100, ALKOX E-130, ALKOX E-160, ALKOX E-240, ALKOX E-300, ALKOX L-6, ALKOX L-8, ALKOX L-11 Additionally, the PEO® Water-Soluble Thermoplastic Resins such as PEO-27, PEO-18Z, PEO-15Z, PEO-8Z, PEO-4, PEO-3Z, PEO-2, PEO-1Z, available from Sumitomo Seika Chemicals Co., Ltd., of Osaka, Japan, are believed to be suitable water soluble poly(ethylene oxide) resins for use in the coating compositions of the present invention.

It is further noted that water soluble PEO resin materials which are copolymers of ethylene oxide with propylene oxide may also be suitable for enhancing gloss control properties in the coating compositions of the present invention. Such copolymers of ethylene oxide and propylene oxide include, without limitation, ALKOX resins such as ALKOX EP-10 and ALKOX EP-20, which are commercially available from Meisei Chemical Works, LTD, of Kyoto, Japan.

The polymer binders suitable for use in the present invention are water insoluble emulsion polymers derived from one or more ethylenically unsaturated monomers. The water insoluble emulsion polymers may also comprise one or more of the following components: acid functional residues, polyvalent metal ion and complex crosslinking agents. Such polymer binders are described in, for example, U.S. Pat. Nos. 2,795,564, 3,328,325, 3,467,610, 3,554,790, 3,573,329, 3,711,436, 3,808,036, 4,150,005, 4,517,330, 5,149,745, 5,319,018, 5,574,090, 5,676,741 and 6,548,596.

Water insoluble polymer binders suitable for use in the present invention have glass transition temperatures, $T_g$, from −1 to 120° C., such as from 25° C. to 90° C., or from 40° C. to 80° C., or even from 50° C. to 75° C. The "glass transition temperature," or "$T_g$," as used herein, means the temperature at or above which a glassy polymer will undergo segmental motion of the polymer chain. Glass transition temperatures of a polymer can be estimated by the Fox Equation (Bulletin of American Physics Society, 1 (3), p 123, 1956), as follows:

$$1/T_g = w_1/T_{g,1} + w_2/T_{g,2}$$

For a copolymer comprising two type of monomers, $w_1$ and $w_2$ refer to the weight fraction of the two monomers, and $T_{g,1}$ and $T_{g,2}$ refer to the glass transition temperatures of the two corresponding homopolymers made from the monomers. For polymers containing three or more monomers, additional terms are added ($w_n/T_{g,n}$). The $T_g$ of a polymer can also be measured by various techniques including, for example, differential scanning calorimetry (DSC).

Methods for preparation of the water insoluble polymer binders suitable for use in the coating composition of the present invention are known in the art and not especially limited. The preparation method may be selected from solution, dispersion and emulsion polymerization processes. Emulsion polymerization is especially useful for preparing useful polymer binders. The practice of emulsion polymerization is well known and discussed in detail in the literature, for example, in D. C. Blackley, *Emulsion Polymerization* (Wiley, 1975). The polymerization temperature is typically from ambient temperature up to 90° C. and may also involve use of dispersing agents, initiators, accelerators, emulsifiers, chain transfer agents. As will be readily understood by persons of ordinary skill, dispersing agents may include anionic or nonionic dispersing agents, polymerization initiators may be of the free radical type, such as ammonium or potassium persulphate. The initiators may be used alone or with an accelerator, such as potassium metabisulphite or sodium thiosulphate. Examples of suitable emulsifiers include, for example, alkaline metal and ammonium salts of alkyl, aryl, alkaryl and aralkyl sulphonates, sulphates, polyether sulphates, and alkoxylated derivatives of fatty acids, esters, alcohols, amines, amides and alkylphenols. Chain transfer agents, including mercaptans, polymercaptans and polyhalogen compounds may be used in the polymerization mixture to control molecular weight of the polymer.

Suitable water insoluble polymer binders may contain, as polymerized units, from 5% to 90%, such as from 5% to 80%, from 5% to 50%, or even from 10 to 20%, of one or more monoethylenically unsaturated monomers containing an acidic functional group selected from one or more of carboxylic, sulfonic and phosphonic groups. For example, suitable carboxylic acid monomers include, without limitation, monoethylenically unsaturated ($C_3$-$C_9$) carboxylic acid monomers, such as unsaturated monocarboxylic and dicarboxylic acid monomers. For example, unsaturated monocarboxylic acids include acrylic acid (AA), methacrylic acid (MAA), alpha-ethacrylic acid, beta-dimethylacrylic acid, vinylacetic acid, allylacetic acid, ethylidineacetic acid, propylidineacetic acid, crotonic acid, acryloxypropionic acid and alkali and metal salts thereof. Suitable unsaturated dicarboxylic acid monomers include, for example, maleic acid, maleic anhydride, fumaric acid, itaconic acid, citraconic acid, mesaconic acid, methylenemalonic acid and alkali and metal salts thereof.

Additional suitable monoethylenically unsaturated monomers containing sulfonic acid or phosphonic groups include, for example, 2-acrylamido-2-methyl-1-propane-sulfonic acid, 2-methacrylamido-2-methyl-1-propanesulfonic acid, 3-methacryl-amido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrene-sulfonic acid, vinylsulfonic acid, 2-sulphoethyl methacrylate, 3-sulfopropyl acrylate, 3-sulfopropyl methacrylate, sulfomethyl acrylamide, sulfomethyl methacrylamide and phosphoethyl methacrylate.

As a further example, the one or more monoethylenically unsaturated monomers may comprise one or more (meth)acrylic monomers containing one or more pendant reactive functional groups selected from hydroxy, thiol, and amino groups. Suitable hydroxy-functional (meth)acrylic monomers include, for example, hydroxyl ($C_1$-$C_4$)alkyl (meth)acrylates, such as hydroxyethyl methacrylate, hydroxyethyl acrylate, hydroxypropyl methacrylate and hydroxypropyl acrylate. Suitable amino-functional (meth)acrylic monomers include, for example, dimethylaminopropyl methacrylamide, dimethylaminopropyl acrylamide, dimethylaminoethyl methacrylate, dimethylaminoethyl acrylate, dimethyl-aminopropyl methacrylate and dimethylaminopropyl acrylate. Suitable thiol-functional (meth)acrylic monomers include, for example, 2-mercaptopropyl methacrylate.

As a still further example, the one or more monoethylenically unsaturated monomers may comprise one or more ($C_1$-$C_{20}$)alkyl (meth)acrylate ester monomers, such as, without limitation, methyl acrylate, ethyl acrylate, propyl acrylate, isopropyl acrylate, butyl acrylate, isobutyl acrylate, secondary butyl acrylate, tertiary-butyl acrylate, methyl methacrylate, ethyl methacrylate, propyl methacrylate, isopropyl methacrylate, cyclopropyl, methacrylate, butyl methacrylate and isobutyl methacrylate, hexyl and cyclohexyl methacrylate, cyclohexyl acrylate, isobornyl methacrylate, 2-ethylhexyl acrylate (EHA), 2-ethylhexyl methacrylate, octyl (meth)acrylate, decyl (meth)acrylate, isodecyl (meth)acrylate, undecyl (meth)acrylate, dodecyl (meth)acrylate (also known as lauryl (meth)acrylate), tridecyl (meth)acrylate, tetradecyl (meth)acrylate (also known as myristyl (meth)acrylate), pentadecyl (meth)acrylate, hexadecyl (meth)acrylate (also known as cetyl (meth)acrylate), heptadecyl (meth)acrylate, octadecyl (meth)acrylate (also known as stearyl (meth) acrylate), nonadecyl (meth)acrylate, eicosyl (meth)acrylate and combinations thereof. Typically, the ($C_1$-$C_{20}$)alkyl (meth)acrylate esters are ($C_1$-$C_8$)alkyl (meth)acrylate esters and preferably ($C_1$-$C_8$)alkyl acrylate esters; more preferably, the ($C_1$-$C_{20}$)alkyl (meth)acrylate esters are selected from methyl acrylate, ethyl acrylate, butyl acrylate and 2-ethylhexyl acrylate; most preferably, the acrylate esters are selected from butyl acrylate and 2-ethylhexyl acrylate.

The one or more monoethylenically unsaturated monomers used to prepare the water insoluble polymer binders, may comprise one or more vinylaromatic monomers, such as, for example, styrene, alpha-methyl styrene and substituted styrenes, such as vinyl toluene, 2-bromostyrene, 4-chlorostyrene, 2-methoxystyrene, 4-methoxystyrene, alpha-cyanostyrene, allyl phenyl ether and allyl tolyl ether.

It is also possible for the water insoluble polymer resins to comprise, as polymerized units, 0-50%, such as 0-25%, of one or more other copolymerizable monomers. Suitable other copolymerizable monomers include, for example, butadiene, acrylonitrile, methacrylonitrile, crotononitrile, alpha-chloroacrylonitrile, ethyl vinyl ether, isopropyl vinyl ether, isobutyl vinyl ether, butyl vinyl ether, diethylene glycol vinyl ether, decyl vinyl ether, ethylene, methyl vinyl thioether and propyl vinyl thioether, esters of vinyl alcohol, and amides of ethylenically unsaturated ($C_3$-$C_6$)carboxylic acids, amides of ethylenically unsaturated ($C_3$-$C_6$)carboxylic acids that are substituted at the nitrogen by one or two ($C_1$-$C_4$)alkyl groups, acrylamide, methacrylamide and N-methylol (meth)acrylamide.

The aqueous coating composition according to the present invention comprises: from 1 to 95% by weight of an aqueous solvent comprising water; from 5 to 80% by weight of a polymer binder; and from 0.05 to 10% by weight of a water soluble poly(ethylene oxide), all weight percents being based on the total weight of the aqueous coating composition. The aqueous coating compositions of the present invention have a viscosity below 10,000 centipoises.

In some embodiments, the aqueous coating composition may comprise from 50 to 95%, or even 75 to 95%, by weight, of the aqueous solvent comprising water.

In some embodiments, the aqueous coating composition may comprise from 10 to 60%, or even 25 to 60%, by weight, of the polymer binder.

In some embodiments, the aqueous coating composition may comprise from 0.05 to 8%, or even 0.1 to 5%, or even 0.1 to 2.5%, by weight, of the water soluble poly(ethylene oxide).

As with other, known aqueous coating compositions, the compositions in accordance with the present invention may contain additional ingredients besides the aqueous solvent comprising water, polymer binder and water soluble poly (ethylene oxide). For example, the coating compositions may also comprise one or more solvents, preservatives, wetting aids, leveling aids, wax emulsions, defoamers and viscosity modifiers, among other things. Most, if not all, such additional components are well-known to persons of ordinary skill in the relevant art and their use is not particularly limited in connection with the present invention. The following information is for general guidance only, since it is believed that persons of ordinary skill are already well-equipped and in the best position to assess which, if any, such additional components, known now or in the future, may be beneficial depending on the particular coating composition and its intended application.

For example, without limitation, suitable solvents include, for example, coalescing solvents and plasticizing solvents. Suitable coalescing solvents, for example, may be selected from Butoxyethyl PROPASOL™, Butyl CARBITOL™, Butyl CELLOSOLVE™ Acetate, Butyl CELLOSOLVE™, Butyl DIPROPASOL™, Butyl PROPASOL™, CARBITOL™ PM-600, CARBITOL™ Low Gravity, CELLOSOLVE™ Acetate, CELLOSOLVE™, Ester EEP™, FILMER IBT™, Hexyl CARBITOL™, Hexyl CELLOSOLVE™, Methyl CARBITOL™, Methyl CELLOSOLVE™ Acetate, Methyl CELLOSOLVE™, Methyl DI PROPASOL™, Methyl PROPASOL™ Acetate, Methyl PROPASOL™, Propyl CARBITOL™, Propyl CELLOSOLVE™, Propyl DIPROPASOL™ and Propyl PROPASOL™, among others, all of which are available from Dow Chemical Company of Midland, Mich., U.S.A.

Suitable plasticizing solvents, for example, may be selected from ethylene glycol phenyl ether (commercially available as "DOWANOL™ EPh" from Dow Chemical Company), propylene glycol phenyl ether (commercially available as "DOWANOL™ PPh" from Dow Chemical Company); 2,2,4-Trimethyl-1,3-pentanediol diisobutyrate; tributoxy ethyl phosphate; dibasic esters such as dimethyl adipate, dimethyl succinate, dimethyl glutarate, dimethyl malonate, diethyl adipate, diethyl succinate, diethyl glutarate, dibutyl succinate, and dibutyl glutarate (including products commercially available under the trade designations DBE, DBE-3, DBE-4, DBE-5, DBE-6. DBE-9, DBE-IB, and DBE-ME from E.I. du Pont de Nemours and Company, of Wilmington, Del., U.S.A.); dialkyl carbonates such as dimethyl carbonate, diethyl carbonate, dipropyl carbonate, diisopropyl carbonate, and dibutyl carbonate; phthalate esters such as dibutyl phthalate, diethylhexyl phthalate, and diethyl phthalate, among others.

Suitable preservatives include KATHON® CG/ICP, KORALONE™ BIT, NEOLONET™ M-10, ROCIMA™ 586, UCARCIDE™ 25, UCARCIDE™ 50, BIOBAN™ BP, BIOBAN™ DXN, BIOBAN™ CS-1135, BIOBAN™ CS-1246, DOWICIDE™ OPP, DOWICIL™ 75 and DOWICIL™ 150, all of which are available from the Dow Chemical Company, as well as others familiar to persons of ordinary skill.

Resins and emulsions suitable for use in the coating compositions of the present invention include, without limitation, aqueous polyethylene wax dispersions such as those based on A-C® polyethylenes and Acumist® polyethylenes commercially available from Honeywell Corporation of Morristown, N.J., U.S.A.; Epolene® polyethylene polymers, aqueous polypropylene wax dispersions such as those based on Acumist® polypropylenes also commercially available from Honeywell Corporation, and Epolene® maleated polypropylenes from Westlake Chemical of Houston, Tex., U.S.A.; aqueous polyolefin dispersions such as those based on A-C® polyolefins and maleated polyolefins available from Honeywell Corporation; alkali-soluble resins based on the Acrysol® and Rhoplex® emulsions, ASR PLUS S25 all commercially available from Dow Chemical Company; Joncryl® polymers commercially available from BASF of Florham Park, N.J., U.S.A.; aqueous styrene maleic anhydride resins such as those from Sartomer of Exton, Pa., U.S.A.; and aqueous dispersions of rosin esters such as those commercial available from Resinall Corporation of Severn, N.C., U.S.A.; apiphjatic polyester and polycarbonate based polyurethane dispersions (U 410, U 615, U 801, U 910, U 915, U 933), castor oil and linseed oil based polyurethane dispersions (CUR 21 CUR 69, CUR 99, CUR 991, CUR 3), all commercially available from Alberdingk Boley, Inc. of Greensboro, N.C., U.S.A.; and SANCURE® polyurethane dispersions commercially available from Lubrizol of Wickliffe, Ohio, U.S.A.

Defoamers may for example, without limitation, be selected from those known now or in the future to persons of ordinary skill including SILFOAM™ SE-21, commercially available from Wacker Chemical Corporation of Calvert City, Ky., U.S.A.; DEE FO PI-35, available from Munzig Corporation. Of Paterson, N.J., U.S.A.; DOW CORNING® 73 Additive, commercially available from Dow Corning of Midland, Mich., U.S.A.; and BYK Defoamer BYK-024, commercially available from BYK Additives & Instruments of Wallingford, Conn., U.S.A.

The use, application and benefits of the present invention will be clarified by the following discussion and description of exemplary embodiments and applications of the mixture and laundry formulations present invention.

EXAMPLES

Floor Polish Formulations

To test the gloss control over vinyl composition flooring substrates, sample formulations were prepared according to the details provided in Table 1 and Table 2. After completely mixed (for 30 minutes), the PEO containing formulations were applied to vinyl composition substrates [12 inch (305 mm)×12 inch (305 mm)×⅛ inch (3.2 mm) Armstrong® Excelon® Vinyl Composition Tile Pattern 56790, Armstrong World Industries, Inc, Lancaster, Pa. 17604] using a #38 wire wound rod. The coatings were allowed to dry for 1 hour. Subsequent coats were applied as specified for the type of evaluation that was going to be performed (2-4 coats to determine gloss), 2 coats to determine slip resistance, scuff mark resistance and black heel mark resistance (ARMSTRONG® EXCELON® Vinyl Composition Tile Pattern 56830 used).

The test for removability was performed 2 days after the coatings were applied to the vinyl substrates. For these tests the coated substrates were stored in an oven set at 42° F. from when the coatings were applied to the substrate until right before the test was performed.

The method for determining coating removability utilized a commercial floor stripping solution along with an Abrasion Tester apparatus (Model No. AG-8100 from Pacific Scientific, GARDNER/NEOTEC® Instrument Division, Silver Spring, Md., USA, equipped with a PB-8112 nylon brush from Byk Additives & Instruments, Columbia, Md., USA) as a means of reproducibly determining the removal of the dried films. In order to distinguish between the relative removal properties of different coatings, the number of cycles for the brush to move back and forth over the coated surface to effect complete removal of the film was taken as a measure of removability. The commercial floor stripper used was FREEDOM® (Diversey Inc. Sturtevant, Wis. 53177 USA) which contained multiple reagents to swell the polymer film including: solvents, such as diethylene glycol phenyl ether, and ethylene glycol phenyl ether, amines such as monoethanolamine, and surfactants such as sodium xylene sulfonate. The commercial floor stripper was diluted with clean tap water generating a dilution solution of 1 part FREEDOM® stripper and 4 parts clean tap water. The coated substrate was placed on the Abrasion Tester apparatus in such a manner that the brush traveled at right angles to the longer side of the dried film. 5 mL. of diluted stripper solution was placed on the panel and then the Abrasion Tester machine was activated to allow the brush to oscillate back and forth over the panel. The following rating system was used: Number of Cycles Required for Total Removal: <10 (Excellent Ease of Removal), >10 but <20 (Good), >20 but <50 (Fair), >50 (Poor).

ASTM D-2047 was used to determine slip resistance of the coated VCT tiles.

The PEO, TS-100 and ACUSOL additives where added to the test formulation and water was adjusted to provide the total weight of the ingredients to be 100 grams. The formulations were mixed for 30 minutes using an overhead mixer and coatings were applied with a #38 wire wound rod drawn down onto vinyl composite floor tiles. Film performance data are given in Table 3. Gloss measurements were taken after the films were allowed to dry for 24 hours. The method for determining the gloss is described in "Annual Book of ASTM Standards," Section 15, Volume 15.04, Test Procedure ASTM D 1455 (2000). A Gardner Byk Micro-Tri-Gloss meter, catalog number 4520, was used to record 60° and 20° gloss. Water resistance was evaluated after the films were dry for 24 hours. The method for determining the water resistance is described in "Annual Book of ASTM Standards," Section 15, Volume 15.04, Test Procedure ASTM D 1793 (2000). The following ratings were applied to the films after being exposed to a water drop for 1 hour and wiped off:

Ex=no effect,
TrWh=Trace whitening,
Wh=whitening,
Hwh=heavy whitening,
Bl=blisters.

The presence of sediment/gel was qualitatively assessed, after allowing the formulations to sit at ambient temperatures for 30 days in glass jars, by visually observing the bottom of the glass containers holding the formulations and assigning a rating of "nil," "slight," "moderate," or "heavy."

"Burnish resistance" evaluates the changes in coating appearance (gloss) after a number of cycles from a soft cloth. The desired result is to have the appearance (gloss) not change. The cloth used was a 12 ply 2 inch [5.1 cm]×2 inch [5.1 cm] Gauze Sponge No. 908294 from VENTURE TIDI Products of Neenah, Wis., 54956, U.S.A. The coated panels (2 coats on black VCT Armstrong Pattern 56790) were placed on a flat surface and rubbed manually using index finger with gauze pad in an up and down motion spanning 3 inches for 5 back and forth cycles. Results are reported as the difference between the 85° gloss measured after rubbing and the 85° gloss measured before rubbing, so that the lower the difference, the better.

85° Gloss after rubbing–85° Gloss before rubbing="Burnished" Gloss.

Experimental floor polish compositions were formulated having the components listed in the following TABLE 1 in common, in the listed amounts.

TABLE 1

Standard Test Formulation Components - Floor Polish

| Material In Proper Order of Addition | Description/Function | Percent (By Weight) |
|---|---|---|
| Water | Diluent | 45.5* |
| Additive | Gloss Control | X* |
| KATHON ® CG/ICP | Preservative | 0.04 |
| CAPSTONE ™ FS-60 (1%) | Wetting Aid | 1.0 |
| Diethylene Glycol Ethyl Ether | Coalescing Solvent | 4.0 |
| Dipropylene Glycol Methyl Ether | Coalescing Solvent | 1.0 |
| Benzoflex ® 131 | Plasticizing Solvent | 1.0 |
| Tributoxy Ethyl Phosphate | Leveling Aid | 2.0 |
| Polymer (38%)** | Vehicle | 36.67 |
| Chemrez 30 (30%) | Alkali-Soluble Resin | 2.84 |
| Epolene ® E-43N (40%) | Polypropylene Wax Emulsion | 2.63 |
| A-C ®-325N (35%) | Polyethylene Wax Emulsion | 3.30 |
| SilFoam ® SE-21 | Defoamer | 0.02 |

*Water charge adjusted to provide 100% by weight formulation when additive added.
**Floor Polish Polymer Vehicle was a polymer prepared in accordance with the emulsion method described in U.S. Pat. No. 6,548,596, which is incorporated herein by reference. This polymer vehicle had a $T_g$ of 71.1° C. and comprised:
33% Butyl Methacrylate
10% Isobutyl Methacrylate
45% Styrene
12% Methacrylic Acid
1.5% zinc
$T_{g(Fox)} = 71.1°$ C.

The sample floor compositions were prepared using the aforesaid standard test formulation components and various types and amounts of matting agents as provided in TABLE 2 below.

TABLE 2

Matting Agents Used In Floor Polish Composition Examples

| Example # | PEO Matting Agent | Known Matting Agent | Amount (grams) |
|---|---|---|---|
| 1 | None | none | standard |
| 2 | POLYOX WSR N-10 | | 0.10 |
| 3 | POLYOX WSR N-10 | | 0.25 |
| 4 | POLYOX WSR N-10 | | 0.50 |
| 5$^{Comp}$ | | ACEMATT TS-100$^S$ | 0.10 |
| 6$^{Comp}$ | | ACEMATT TS-100$^S$ | 0.25 |
| 7$^{Comp}$ | | ACEMATT TS-100$^S$ | 0.50 |
| 8 | POLYOX WSR N-205 | | 0.10 |
| 9 | POLYOX WSR N-205 | | 0.25 |
| 10 | POLYOX WSR N-205 | | 0.50 |
| 11 | POLYOX WSR N-12K | | 0.1 |
| 12 | POLYOX WSR N-12K | | 0.25 |
| 13 | POLYOX WSR N-12K | | 0.50 |
| 14$^{Comp}$ | | ACUSOL 810A$^T$ | 0.50 |
| 15$^{Comp}$ | | ACUSOL 842$^T$ | 0.50 |
| 16$^{Comp}$ | | ACUSOL 830$^T$ | 0.50 |

$^{Comp}$ = Comparative Example
$^S$ACEMATT TS-100 is a silicon dioxide-based (CAS No. 112945-52-5) matting agent commercially available from Evonik Degussa Corporation of Parsippany, New Jersey 07054 U.S.A.
$^T$ACUSOL 810A, ACUSOL 842, ACUSOL 830 are non-associative thickeners. More particularly, they are alkali-soluble-emulsions based on polyacrylic acid, commercially available from Dow Chemical Company of Midland, Michigan, U.S.A.

The testing results are presented in Table 3 below.

TABLE 3

Test Results of Floor Polish Testing

| Property | Ex# 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 0 Coat 20° | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 | 0.7 |
| 0 Coat 60° | 5.8 | 5.8 | 5.8 | 5.8 | 5.8 | 5.8 | 5.8 | 5.8 | 5.8 | 5.8 | 5.8 | 5.8 | 5.8 | 5.8 | 5.8 | 5.8 |
| 1 coat 20° | 2.5 | 1.5 | 0.6 | 0.4 | 2.1 | 1.9 | 1.4 | 0.4 | 0.4 | 0.2 | 0.5 | 0.5 | 0.2 | 4.3 | 3.8 | 2.5 |
| 1 coat 60° | 19 | 13.3 | 7.3 | 4.1 | 14.1 | 12.9 | 10.5 | 4.0 | 4.0 | 2.0 | 5.4 | 5.0 | 2.3 | 18 | 20.2 | 14 |
| 2 coats 20° | 9.6 | 7.0 | 1.2 | 0.5 | 6.2 | 5.5 | 3.9 | 0.8 | 0.4 | 0.2 | 0.9 | 0.5 | 0.2 | 8.8 | 4.1 | 4.0 |
| 2 coats 60° | 45.9 | 38 | 10 | 4.5 | 30.1 | 27.3 | 22.8 | 5.8 | 2.5 | 2.1 | 7.9 | 3.7 | 2.3 | 28 | 24 | 20 |
| 3 coats 20° | 25 | 13 | 1.3 | 0.5 | 12.1 | 7.6 | 4.5 | 0.7 | 0.2 | 0.1 | 0.9 | 0.3 | 0.1 | 9.5 | 5.3 | 3.8 |
| 3 coats 60° | 65.6 | 54.1 | 10.9 | 4.4 | 43.2 | 34.1 | 24.4 | 6.7 | 2.1 | 0.4 | 8.6 | 2.5 | 0.5 | 28 | 23 | 18 |
| 4 coats 20° | 42.8 | 17.9 | 1.4 | 0.4 | 11.2 | 6.4 | 3.9 | 0.6 | 0.2 | 0.2 | 0.8 | 0.3 | 0.2 | 9.0 | 5.0 | 4.0 |
| 4 coats 60° | 81.9 | 63.9 | 11.5 | 3.3 | 41.6 | 30.4 | 23.2 | 7.1 | 2.1 | 1.9 | 7.8 | 2.3 | 2.1 | 27 | 22 | 15 |
| Black Heel Mark Resistance {marks/sq. in] | 0.5 | 0.52 | 0.35 | 0.25 | 0.35 | 0.35 | 0.42 | 0.4 | 0.3 | 0.21 | 0.4 | 0.3 | 0.2 | 0.5 | 0.6 | 0.55 |
| Water Resistance, 2 coats | Ex | Ex | TrWh | TrWh | Exc | Exc | TrWh | TrWh | TrWh | TrWh | Ex | TrWh | Wh | Ex | Ex | Ex |
| Slip Resistance | 0.6 | 0.62 | 0.6 | 0.65 | <0.5 | <0.5 | <0.5 | 0.5 | 0.5 | 0.5 | 0.5 | 0.5 | 0.5 | 0.5 | 0.55 | 0.55 |
| Removability | Exc | Exc | Exc | Exc | Ex | Ex | Ex | Ex | Ex | Ex | Ex | Ex | Ex | Ex | Ex | Ex |
| Sediment/Gel | Nil | Nil | Nil | Nil | Sl | Sl | Mod | Nil | Nil | Nil | nil | nil | nil | nil | nil | nil |
| Burnish Resistance | 2.4 | 3.1 | 3.4 | 3.8 | 3.3 | 4.9 | 4.8 | 2 | 1.1 | 2.3 | 3.1 | 4.6 | 4.8 | 5.0 | 4.5 | 5.2 |

Paint Formulation

To test the gloss control over typical wall substrate material, a sample formulation was prepared according to the details provided in Table 4.

TABLE 4

Standard Sample Formulation Components - Paint

| Materials | Description | Grams |
|---|---|---|
| Polymer Binder 2$^{PV}$ | Vehicle | 565.64 |
| BYK 024 | Wetting Agent | 0.97 |
| Premix | | |
| Propylene Glycol | Solvent | 4.16 |
| TRITON X-100 | Surfactant | 4.26 |
| Water | Diluent | 16.17 |
| KATHON LX (1.5%) | Preservative | 1.45 |
| TAMOL 2001 | Dispersant | 1.94 |
| Ammonia (28%) | Base | 0.97 |
| Ti-Pure R-746 | Titanium Dioxide | 275.94 |
| Water | Diluent | 86.95$^W$ |
| UCAR Filmer IBT | Solvent | 7.65 |
| ACRYSOL RM 2020 NPR | Thickener | 29.05 |
| ACRYSOL STC-275 (adj to 85 KU) | Thickener | 2.91 |
| BYK 024 | Wetting Agent | 1.94 |
| Totals | | 1000 |

$^W$amount of water was adjusted to account for addition of POLYOX
**Polymer binder vehicle of the sample paint compositions were prepared in accordance with the acrylic emulsion method described in U.S. Pat. No. 2,795,564, which is corporate herein by reference. This polymer binder vehicle comprised:
28.8% methyl methacrylate
50% butyl acrylate
14% acrylonitrile
5% acetoacetoxyethyl methacrylate
0.2% allyl methacrylate
2% methacrylate acid
$T_{g(Fox)}$ = −0.5° C.

The sample paint formulation of Table 4 was then used as the base to prepare a control (Sample A) and 3 specific paint examples as follows:
Paint Sample A: no gloss control agent added (control);
Paint Sample B: 1.0 gram of POLYOX WSR N-10;
Paint Sample C: 0.5 gram of POLYOX WSRN-12K; and
Paint Sample D: 1.0 gram of POLYOX WSRN-205.

After thorough mixing, the sample paint formulation was drawn down on a Leneta 5C chart paper with a 3 mil Bird film applicator according to ASTM D-523-89. The drawdowns were allowed to dry for 7 days at 77° F./50% relative humidity. These samples were evaluated for gloss and sediment as described hereinabove in connection with the floor polish examples. The results of the aforesaid testing are provided in Table 5 below:

TABLE 5

Test Results of Paint Formulation Testing

| Property | Ex. A (control) | Ex. B | Ex. C | Ex. D |
|---|---|---|---|---|
| 60° Gloss | 80 | 9 | 8 | 5 |
| 20° Gloss | 54 | 2 | 3 | 2 |
| Sediment | Nil | Nil | Nil | Nil |

What is claimed is:
1. A coating composition comprising:
A) 1 to 94.95% by weight of an aqueous solvent comprising water;
B) 5 to 80% by weight of a polymer binder comprising polymerized units derived from one or more ethylenically unsaturated monomers, an acid-functional residue, and a polyvalent metal ion; and
C) 0.05 to 10% by weight of a water soluble poly(ethylene oxide) resin having the general formula [—CH$_2$CH$_2$O—]$_n$, wherein n is selected to provide a weight average molecular weight of 100,000 to 1,000,000 grams per mole of the water soluble poly(ethylene oxide),
wherein a single coating of the coating composition provides a 60° gloss of 2.3 to 13.3 and a two-coat burnish resistance of 1.1 to 3.8, wherein the gloss is determined in accordance with ASTM D 1455 (2000) and wherein the burnish resistance is determined as a difference in 85° gloss before and after rubbing with a gauze sponge for 5 cycles.

2. The coating composition according to claim 1, wherein said water soluble poly(ethylene oxide) resin comprises polymerized units derived from ethylene oxide and propylene oxide.

3. The coating composition according to claim 1, comprising 0.1 to 5% by weight of said water soluble poly(ethylene oxide).

4. The coating composition according to claim 1, comprising 10 to 60% by weight of said polymer binder.

5. The coating composition according to claim 1, comprising 75 to 94.95% by weight of said aqueous solvent comprising water.

6. The coating composition according to claim 1, further comprising one of more of the following additional components: solvents, preservatives, wetting aids, leveling aids, wax emulsions, defoamers and viscosity modifiers.

7. A method for providing a low gloss coating on a floor or wall, comprising applying one or more layers to the floor or wall of the coating composition of claim 1, and allowing each layer to dry prior to use or application of another layer.

8. The coating composition according to claim 1, comprising 0.1 to 1% by weight of said water soluble poly(ethylene oxide).

9. The coating composition according to claim 1, wherein the ethylenically unsaturated monomers comprise a ($C_1$-$C_{20}$) alkyl (meth)acrylate ester monomer.

10. The coating composition according to claim 9, wherein the ($C_1$-$C_{20}$)alkyl (meth)acrylate ester monomer is butyl methacrylate, isobutyl methacrylate, or a combination thereof.

11. The coating composition according to claim 1, wherein the acid functional residue is acrylic acid, methacrylic acid, maleic acid, itaconic acid, or a combination thereof.

12. The coating composition according to claim 11, wherein the acid functional monomer is present in an amount of 5 to 90 percent by weight of the polymer binder.

13. The coating composition according to claim 1, wherein the polyvalent metal ion is zinc.

14. The coating composition of claim 1, wherein the coating composition provides a two-coat burnish resistance of less than 3.1.

* * * * *